US007894964B2

(12) United States Patent
Murayama et al.

(10) Patent No.: US 7,894,964 B2
(45) Date of Patent: Feb. 22, 2011

(54) ENGINE CONTROL APPARATUS

(75) Inventors: Masami Murayama, Yokohama (JP); Masahiro Iriyama, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 484 days.

(21) Appl. No.: 12/051,663

(22) Filed: Mar. 19, 2008

(65) Prior Publication Data

US 2008/0255738 A1 Oct. 16, 2008

(30) Foreign Application Priority Data

Apr. 16, 2007 (JP) ............................ 2007-106872

(51) Int. Cl.
*G06F 7/00* (2006.01)

(52) U.S. Cl. ............................ 701/54; 701/22; 701/68; 701/51; 701/67; 477/109; 477/113; 477/143; 477/173; 477/180; 74/333

(58) Field of Classification Search .................. 701/51, 701/54, 55, 64, 67; 477/109, 113, 143, 180; 74/333

See application file for complete search history.

(56) References Cited

U.S. PATENT DOCUMENTS

| | | | | |
|---|---|---|---|---|
| 2003/0196503 | A1* | 10/2003 | Kobayashi .................. | 74/333 |
| 2004/0214687 | A1* | 10/2004 | Morisawa et al. ........... | 477/109 |
| 2006/0003867 | A1* | 1/2006 | Inagaki et al. ............... | 477/113 |

FOREIGN PATENT DOCUMENTS

| | | | |
|---|---|---|---|
| JP | 58-200052 | | 11/1983 |
| JP | 59-120744 | A | 7/1984 |
| JP | 2001-041080 | A | 2/2001 |
| JP | 2005-146918 | A | 6/2005 |
| JP | 2005-163760 | A | 6/2005 |
| JP | 2005-163761 | A | 6/2005 |
| JP | 2006-112255 | A | 4/2006 |
| JP | 2007-032341 | A | 2/2007 |

OTHER PUBLICATIONS

An English translation of the Japanese Office Action of correponding Japanese Application No. 2007-106872, dated Aug. 10, 2010.

* cited by examiner

*Primary Examiner*—Mark Hellner
*Assistant Examiner*—Redhwan Mawari
(74) *Attorney, Agent, or Firm*—Global IP Counselors, LLP

(57) ABSTRACT

An engine control apparatus basically has a clutch release detecting component, a time measuring component and a rotational speed synchronization control component. The clutch release detecting component detects when a clutch arranged between an engine and a manual transmission has been released to prevent rotation from being transferred from the engine to the manual transmission during shifting. The time measuring component measures an amount of time that elapses after the clutch is released. The rotational speed synchronization control component starts rotational speed synchronization control when the clutch is released and a prescribed delay time has elapsed since the clutch was released so that an engine rotational speed matches a predicted input rotational speed of the manual transmission being based on a vehicle speed and a gear position that is occurring after shifting is completed.

20 Claims, 8 Drawing Sheets

ENGINE CONTROL APPARATUS

CROSS-REFERENCE TO RELATED APPLICATIONS

This application claims priority to Japanese Patent Application No. 2007-106872, filed on Apr. 16, 2007. The entire disclosure of Japanese Patent Application No. 2007-106872 is hereby incorporated herein by reference.

BACKGROUND OF THE INVENTION

1. Field of the Invention

The present invention generally relates to an engine control apparatus. More particularly, the present invention relates to an engine control apparatus for synchronizing a rotational speed of an engine to an input rotational speed of a transmission when a clutch is released and the transmission is shifted.

2. Background Information

In a vehicle equipped with a manual transmission, when a clutch of the vehicle is released in order to shift gears, the input rotational speed of the clutch changes depending on the rotational speed of the engine and the output rotational speed of the clutch, i.e., the input rotational speed of the transmission, changes depending on the vehicle speed and the gear position of the transmission. Consequently, a physical shock ("shift shock") will occur if the clutch is connected with differing input and output rotational speeds after the gear position of the transmission has been changed.

In order to reduce the shift shock, it is necessary to synchronize the rotational speed of the engine with the input rotational speed of the transmission. In Japanese Laid-Open Patent Publication No. 58-200052, when the transmission is shifted, the shift shock is suppressed by executing a rotational speed synchronization control wherewith the rotational speed of the engine is controlled to a rotational speed corresponding to the gear position of the transmission. The rotational speed synchronization control is continued until the clutch connects. A clutch pedal switch is provided on the clutch pedal to detect whether the clutch is connected or released.

With Japanese Laid-Open Patent Publication No. 58-200052, the rotational speed synchronization control starts when the driver depresses the clutch pedal in order to shift gears. However, the rotational speed of the engine does not change right away because the rotational speed of the engine is controlled to a rotational speed corresponding to the gear position of the transmission prior to shifting (pre-shift gear position) until the driver operates the shift lever.

When upshifting, it is necessary to lower the rotational speed of the engine. If the rotational speed does not start to decrease soon after depressing the clutch, then it will take time to synchronize the rotational speed of the engine to a rotational speed corresponding to the gear position that the transmission will be in after shifting (post-shift gear position) and the drivability of the vehicle will decline.

In view of the above, it will be apparent to those skilled in the art from this disclosure that there exists a need for an improved engine control apparatus. This invention addresses this need in the art as well as other needs, which will become apparent to those skilled in the art from this disclosure.

SUMMARY OF THE INVENTION

The present invention was conceived in view of these technical issues of the existing technology. One object of the present invention is to improve the drivability of a vehicle in which a rotational speed synchronization control is employed by lowering the rotational speed of the engine quickly during upshifting.

In view of the above, an engine control apparatus is provided for a vehicle equipped with a manual transmission. The engine control apparatus basically comprises a clutch release detecting component, a time measuring component and a rotational speed synchronization control component. The clutch release detecting component is configured to detect when a clutch arranged between an engine and the manual transmission has been released to prevent rotation from being transferred from the engine to the manual transmission when the manual transmission is being shifted. The time measuring component is configured to measure an amount of time that elapses after the clutch is released. The rotational speed synchronization control component is configured to start rotational speed synchronization control when the clutch is released and a prescribed delay time has elapsed since the clutch was released so that an engine rotational speed of the engine matches a predicted input rotational speed of the manual transmission being based on a vehicle speed and a gear position occurring that is occurring after shifting is completed.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
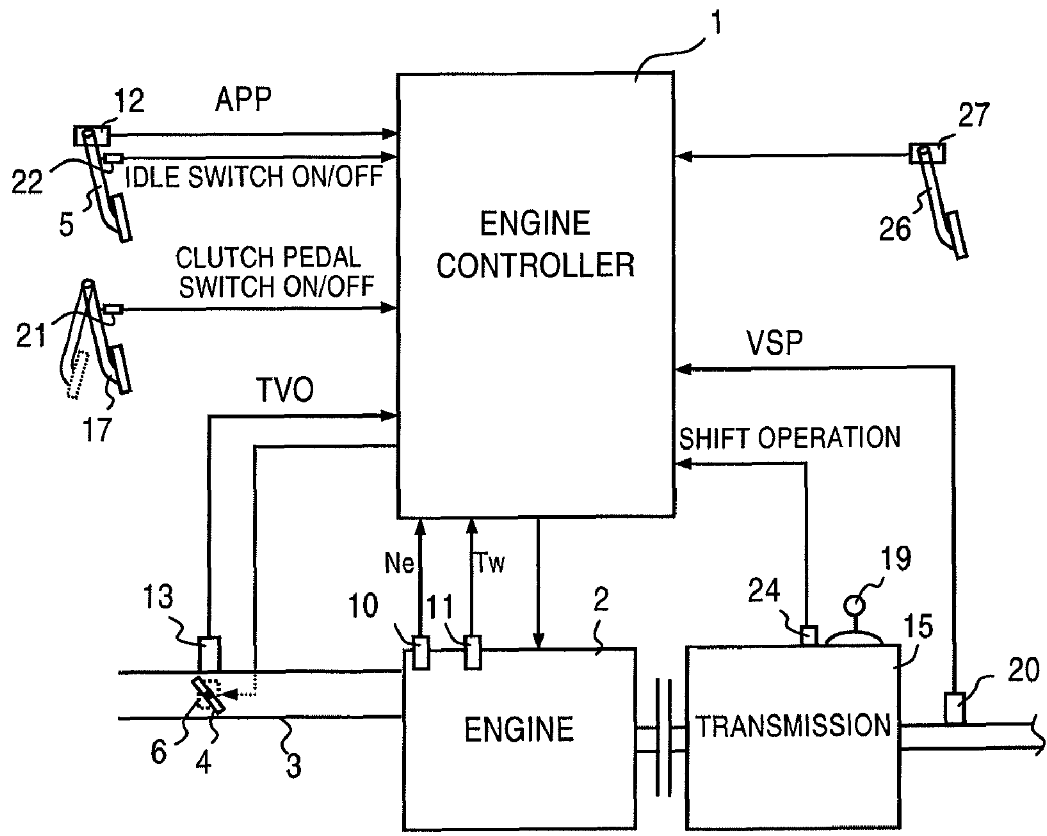
FIG. 1 is a simplified schematic view of a vehicle equipped with an engine control apparatus (engine controller) in accordance with the illustrated embodiments.

FIG. 1 is a simplified schematic view of a vehicle equipped with an engine control apparatus in accordance with the present invention. Basically, the vehicle is equipped with an engine controller 1 and an engine 2 with an intake passage 3 in which a throttle valve 4 is provided. The throttle valve 4 is an electronically controlled throttle valve contrived such that its opening degree can be controlled independently from the position of an accelerator pedal 5. A throttle actuator 6 is mounted to the throttle valve 4 for controlling the opening degree of the throttle valve 4. The vehicle is also provided with a brake pedal 26 that is equipped with a brake switch 27 for detecting operation of the brake pedal 26.

The engine 2 is equipped with an engine speed sensor 10 and a coolant temperature sensor 11. The engine speed sensor 10 is configured and arranged to detect am engine rotational speed Ne of the engine 2. The coolant temperature sensor 11 is configured and arranged to detect a coolant temperature Tw of the engine 2. The accelerator pedal 5 is equipped with an accelerator pedal position sensor 12 and an idle switch 22. The accelerator pedal position sensor 12 is configured and arranged to detect an accelerator pedal position APP indicating the accelerator operation amount. The idle switch 22 is configured and arranged to turn "on" when the depression amount of the accelerator pedal 5 is zero. It is also possible to use the accelerator pedal position sensor 12 to detect if the accelerator operation amount is zero and if an accelerator operation has occurred. Thus, the accelerator pedal position sensor 12 and the idle switch 22 each constitutes one example of an accelerator off detecting component for the illustrated embodiments. The accelerator pedal position sensor 12 constitutes one example of an accelerator operation detecting component. A throttle opening sensor 13 is installed on the throttle valve 4. The throttle opening sensor 13 is configured and arranged to detect a throttle valve opening degree TVO. The throttle opening sensor 13 constitutes another example of an accelerator operation detecting component for the illustrated embodiments. Also the accelerator pedal position sensor 12 and the throttle opening sensor 13 each constitutes one example of an acceleration intent detecting component for the illustrated embodiments.

The output rotation of the engine 2 undergoes a torque-speed conversion in a transmission 15 and is transferred to an output shaft of the transmission 15. From the transmission output shaft, the torque is transferred to drive wheels (not shown) of the vehicle. A clutch pedal 17 is installed between an output shaft of the engine 2 and an input shaft of the transmission 15. A clutch 18 is configured and arranged to be connected and released in response to operation of the clutch pedal 17. The transmission 15 is a manual transmission having discrete gear positions that can be changed by operating a shift lever 19 that is operatively connected to the transmission 15. The transmission 15 has, for example, six forward speeds and one reverse speed.

The engine controller 1 preferably includes a microcomputer with a an engine rotational speed synchronization control program that serves to match the rotational speed of the engine 2 of such a vehicle to an input rotational speed of the manual transmission 15 when a driver operates the clutch 18 so as to disconnect the clutch 18 in order to change the gear position of the transmission 15. In particular, the microcomputer of the engine controller 1 is programmed to control the intake air quantity and ignition timing of the engine 2 such that the engine rotational speed is matched to the input rotational speed of the transmission 15. The transmission input rotational speed to which the engine rotational speed is adjusted is determined based on the vehicle speed and the gear ratio that will result after the shift operation is completed (post-shift gear ratio). The engine controller 1 also includes other conventional components such as an input interface circuit, an output interface circuit, and storage devices such as a ROM (Read Only Memory) device and a RAM (Random Access Memory) device. The internal RAM of the engine controller 1 stores statuses of operational flags and various control data. The internal ROM of the engine controller 1 stores the control programs for various operations. It will be apparent to those skilled in the art from this disclosure that the precise structure and algorithms for the engine controller 1 can be any combination of hardware and software that will carry out the functions of the present invention. Basically, the engine controller 1 constitutes a main part (i.e., a rotational speed synchronization control component) of the engine control apparatus of the illustrated embodiments.

A vehicle speed sensor 20 is installed on the transmission 15. The vehicle speed sensor 20 is configured and arranged to detect a vehicle speed VSP based on the output rotational speed of the transmission 15. A clutch pedal switch 21 is installed on the clutch pedal 17. The clutch pedal switch 21 is configured and arranged to turn on when the driver depresses the clutch pedal 17 and releases the clutch 18. The clutch pedal switch 21 constitutes one example of a clutch release detecting component for the illustrated embodiments. A shift operation sensor 24 is installed on the shift lever 19. The shift operation sensor 24 is configured and arranged to detect an operation direction (shift direction) of the shift lever 19 and to detect a gear position of the transmission 15. The shift operation sensor 24 constitutes one example of a shift operation detecting component for the illustrated embodiments. Also shift operation sensor 24 constitutes one example of a gear position detecting component for the illustrated embodiments.

The detection values of the sensors and switches are fed to the engine controller 1. Based on the received detection signals, the engine controller 1 executes fuel injection control and ignition timing control of the engine 2. The engine controller 1 is further configured and arranged to execute a rotational speed synchronization control whereby the engine rotational speed Ne of the engine 2 is controlled to a target rotational speed tNe corresponding to a gear position of the transmission 15. This rotational speed synchronization control is executed when the clutch pedal 17 is depressed during gear shifting. With the illustrated embodiments, the rotational speed synchronization control of the engine controller 1 is executed after a prescribed delay time has elapsed since the clutch 18 was released. As a result, the drivability can be prevented from declining during upshifting due to the rotational speed of the engine 2 being slow to decrease from a rotational speed corresponding to the pre-shift gear position of the transmission 15.

Figure 2:
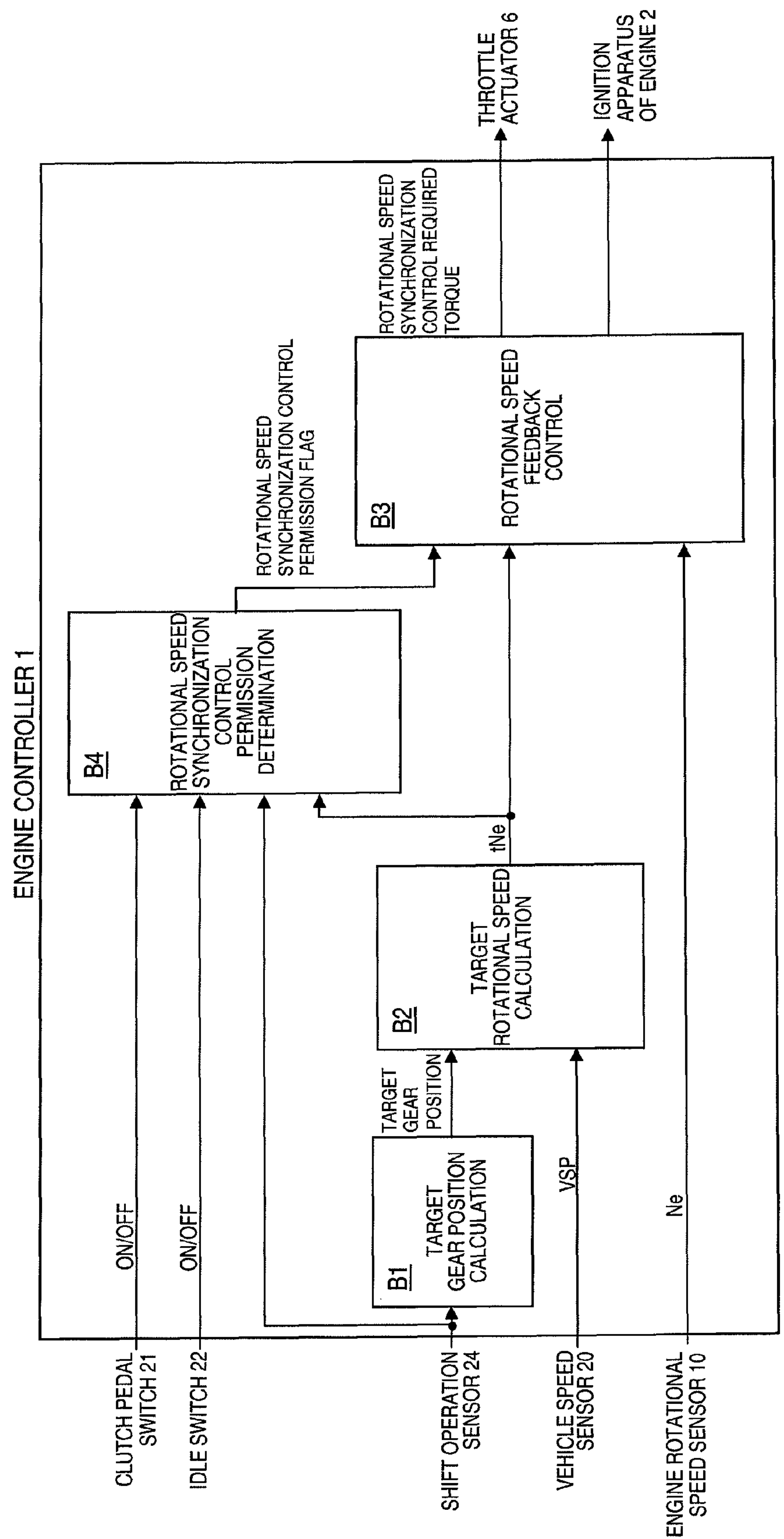
FIG. 2 is a control block diagram illustrating a portion of the engine controller that relates to a rotational speed synchronization control.

FIG. 2 is a control block diagram illustrating the portion of the engine controller 1 that relates to the rotational speed synchronization control.

The engine controller 1 is configured and arranged to calculate a next (target) gear position tGP of the transmission 15 based on a driver shift operation performed by the driver (see, block B1) and to calculate a predicted input rotational speed of the transmission 15 that will result when the transmission 15 is shifted from the current gear position to the target gear position tGP (see, block B2). The predicted input rotational speed of the transmission 15 is used as a target rotational speed tNe of the engine 2. When a rotational speed synchronization control permission flag is "on", the engine controller 1 executes a rotational speed feedback control that serves to control the throttle valve opening degree TVO and an ignition timing retardation amount such that the current engine rotational speed Ne of the engine 2 becomes substantially equal to (matches) the target engine rotational speed tNe (see, block B3).

The first embodiment will now be explained. In the first embodiment, a rotational speed synchronization control permission flag is turned "on" when any one of the three conditions listed below is satisfied.

Condition 1: a first prescribed amount of time has elapsed since the idle switch 22 turned "on", the clutch pedal switch 21 is "on", and a second prescribed amount of time has elapsed since the clutch pedal switch 21 turned "on".

Condition 2: the clutch pedal switch 21 is "on" and the target gear position has changed (i.e., a shift operation has been performed that changed the gear position of the transmission 15).

Condition 3: the clutch pedal switch 21 is "on" and the gear position was the highest gear position (sixth gear in this embodiment) at the point in time when the clutch pedal switch 21 turned "on".

The rotational speed synchronization control executed by the engine controller 1 will now be explained with reference to the flowcharts shown in FIGS. 3 and 4.

Figure 3:
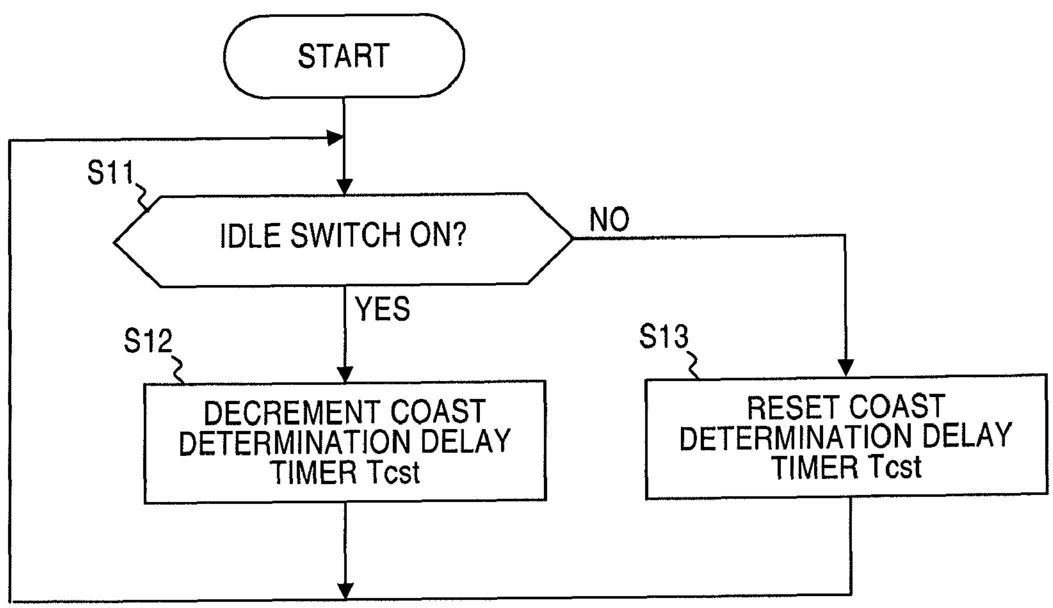
FIG. 3 is a flowchart illustrating the processing executed in order to operate a coast determination delay timer.

FIG. 3 illustrates the processing executed in order to operate a coast determination delay timer Tcst that serves to measure an amount of time that elapses after the depression amount of the accelerator pedal 5 became zero.

In step S11, the engine controller 1 determines if the idle switch 22 is "on". If the idle switch 22 is "on", the engine controller proceeds to step S12 and decrements the coast determination delay timer Tcst Meanwhile, if the idle switch 22 is "off", the engine controller 1 proceeds from step S11 to step S13 and resets the coast determination delay time Tcst to an initial value. The initial value is set to such a value that the coast determination delay timer Tcst will reach zero when a first prescribed amount of time has elapsed since the coast determination delay timer Tcst started being decremented (counting down). The first prescribed amount of time is set to be longer than the amount of time normally required for a driver to operate the shift lever 19 after depressing the clutch pedal 17 such that the clutch pedal switch 21 turns "on" when the driver is upshifting the transmission 15 while the vehicle is in a driven state. The first prescribed amount of time is set to, for example, 1 second. The coast determination delay timer Tcst is a part of the engine controller 1 that constitutes one example of a first determining component of a time measuring component for the illustrated embodiments.

As a result, the coast determination delay timer Tcst starts counting down from the initial value each time the depression amount of the accelerator pedal 5 becomes zero and the vehicle enters a coasting state. If the coasting state continues for a period of time equal to or longer than the first prescribed amount of time, then the value of the coast determination delay timer Tcst will reach zero.

Figure 4:
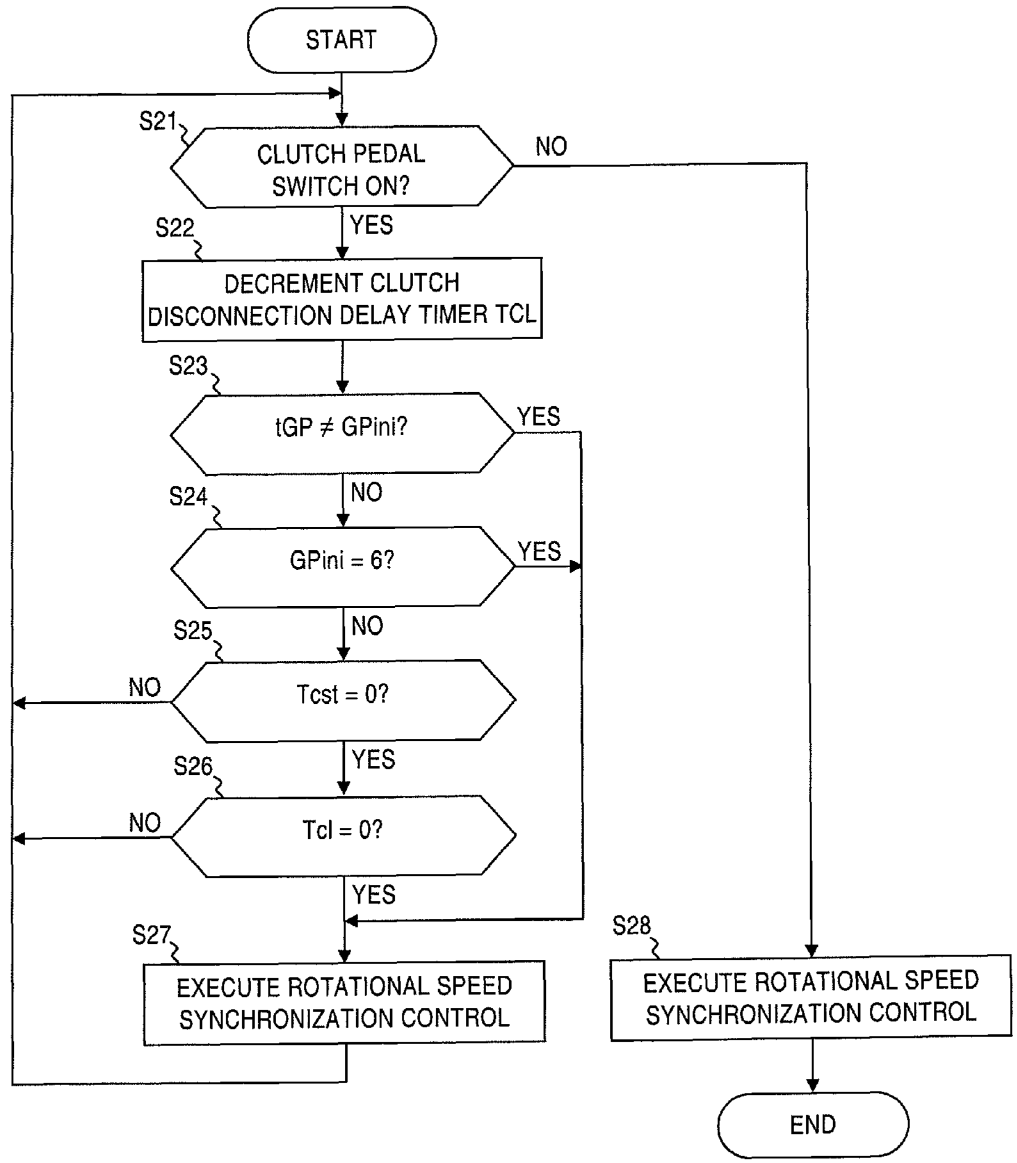
FIG. 4 is a flowchart illustrating the content of a rotational speed synchronization control in accordance with a first embodiment.

FIG. 4 shows the content of the rotational speed synchronization control.

In step S21, the engine controller 1 determines if the clutch pedal switch 21 is "on". If so, the engine controller 1 proceeds to step S22.

In step S22, the engine controller 1 decrements a clutch disconnection delay timer Tcl. The clutch disconnection delay timer Tcl is a timer for measuring an amount of time that elapses after the clutch 18 is released. An initial value of the clutch disconnection delay timer Tcl is set to such a value that the value of the clutch disconnection delay timer Tcl reaches zero when a second prescribed amount of time has elapsed since the clutch disconnection delay timer Tcl started being decremented (counting down). The second prescribed amount of time is set to be shorter than the first prescribed amount of time, e.g., 0.2 to 0.3 second. The clutch disconnection delay timer Tcl is a part of the engine controller 1 that constitutes one example of a second determining component of a time measuring component for the illustrated embodiments.

In step S23, the engine controller 1 determines if the target gear position tGP has changed from the gear position GPini that was in effect when the clutch pedal 17 was depressed, i.e., if a shift operation that changed the gear position of the transmission 15 was performed. If such a shift operation has been performed, then the engine controller 1 proceeds to step S27 and executes the rotational speed synchronization control immediately.

If a shift operation has not been performed, then the engine controller 1 proceeds to step S24, where it determines if the gear position GPini in effect when the clutch pedal switch 21 turned "on" was the highest gear position of the transmission 15 (sixth gear in this embodiment). If the gear position GPini is the highest gear, then the engine controller 1 proceeds to step S27 and executes the rotational speed synchronization control immediately.

In steps S25 and S26, the engine controller 1 determines if the coast determination delay timer Tcst and the clutch disconnection delay timer Tcl have both reached zero. If the values of both timers are zero, then the engine controller 1 proceeds to step S27 and executes the rotational speed synchronization control.

During the rotational speed synchronization control, the engine controller 1 calculates an input rotational speed of the transmission 15 based on the target gear position tGP and the vehicle speed.

The engine controller 1 then controls an engine intake air quantity (by, for example, controlling the throttle actuator 6) and an ignition timing of an engine ignition apparatus such that the engine rotational speed is synchronized to the predicted input rotational speed of the transmission 15.

Afterwards, when the clutch pedal 17 is returned and the clutch pedal switch 21 turns "off", the engine controller 1 proceeds to step S28 and ends the rotational speed synchronization control. The clutch disconnection delay timer Tcl is reset to the initial value.

Figure 5:
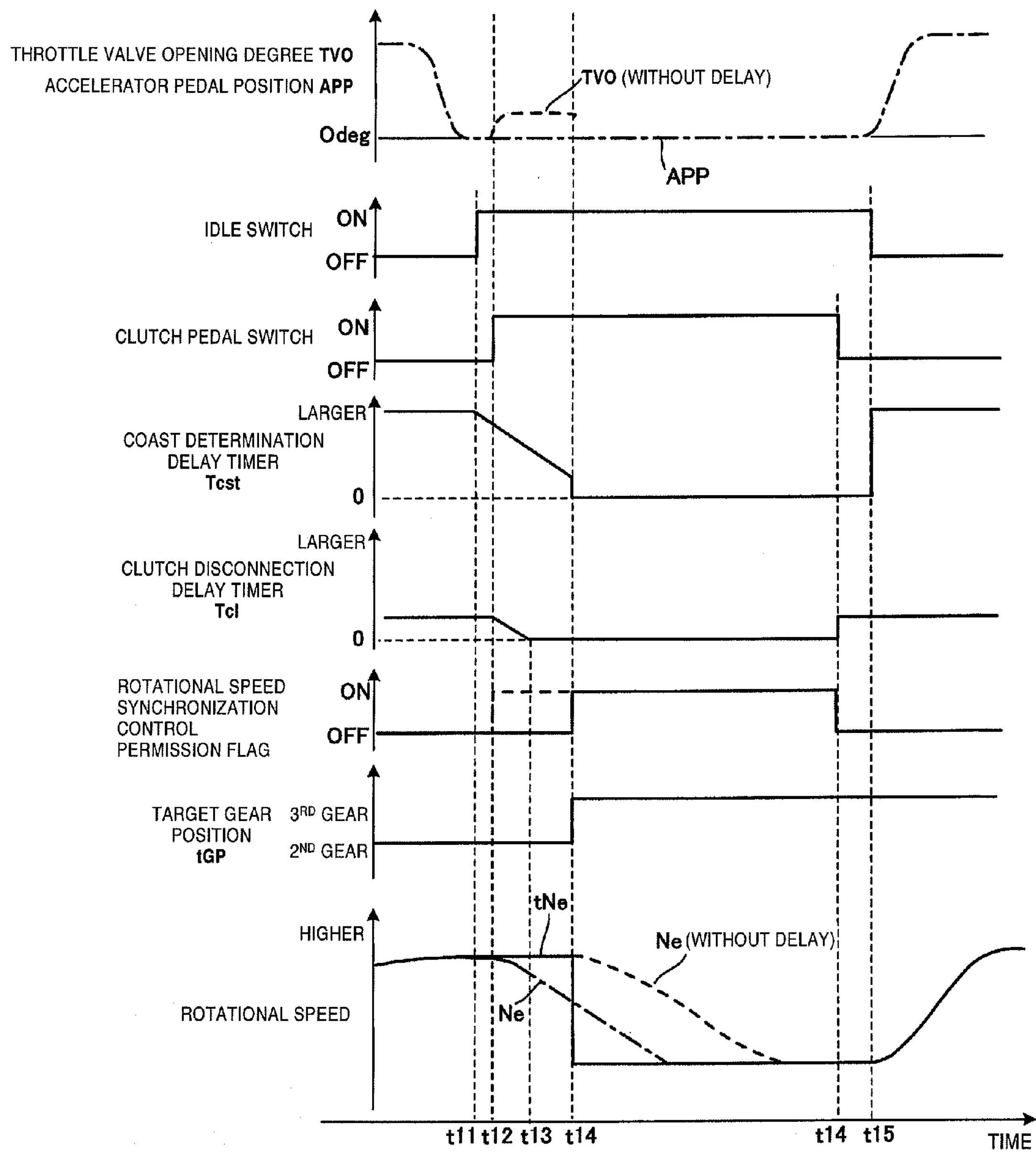
FIG. 5 is a time chart showing what occurs when the transmission is upshifted from second gear to third gear while the vehicle is in a driven state.
Figure 6:
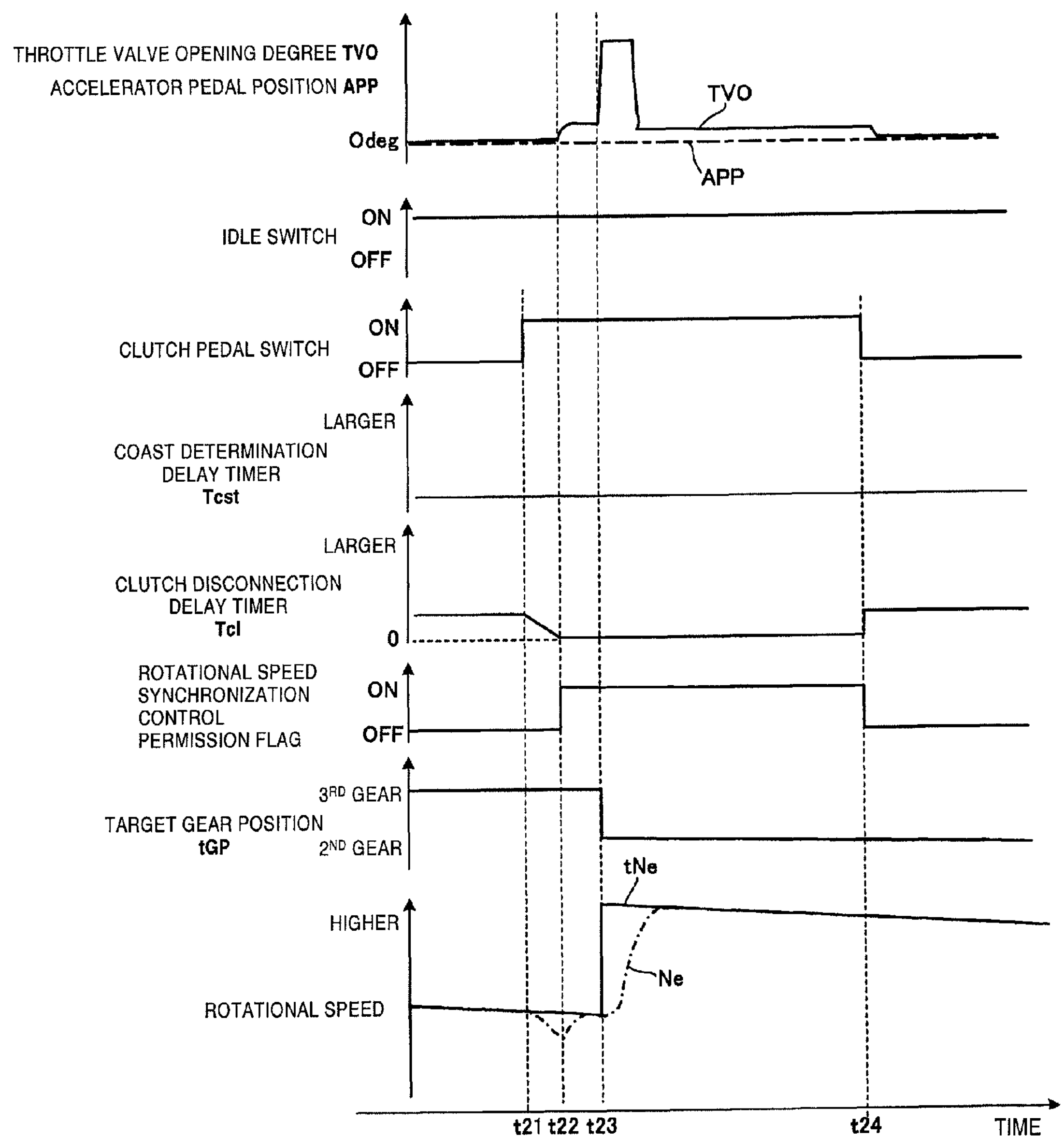
FIG. 6 is a time chart showing what occurs when the transmission is downshifted from third gear to second gear while the vehicle is in a driven state.

FIGS. 5 and 6 are time charts illustrating what occurs during the rotational speed synchronization control.

FIG. 5 shows what occurs when the transmission 15 is upshifted from second gear to third gear while the vehicle is in a driven state.

At a time t11, the idle switch 22 turns "on" and the coast determination delay timer Tcst starts counting down (decrementing). At a time t12, the clutch pedal switch 21 turns "on" and the clutch disconnection delay timer Tcl starts counting down.

The coast determination delay timer Tcst is set such that it requires a longer amount of time (i.e., the first prescribed amount of time) to reach zero than the clutch disconnection delay timer Tcl. Thus, when the accelerator pedal 5 is released and the clutch pedal 17 is depressed immediately thereafter, such as when upshifting from a driven state, the clutch disconnection delay timer Tcl reaches zero sooner than the coast determination delay timer Tcst.

Since the rotational speed synchronization control is not permitted until both of the delay timers Tcst and Tcl have reached zero, the rotational speed synchronization control is not permitted when the clutch disconnection delay timer Tcl reaches zero at a time t13 and the engine rotational speed Ne of the engine 2 decreases as indicated with a single-dot chain line.

Afterwards, at a time t14, the shift lever 19 is operated such that the target gear position tGP is changed from the second gear position to the third gear position. As a result, the rotational speed synchronization control is started and the engine rotational speed Ne of the engine 2 decreases toward the target engine rotational speed tNe. In this example, the rotational speed synchronization control is started because the target gear position tGP is changed. However, if the target gear position tGP is not changed, then the rotational speed synchronization control will be started when the coast determination delay timer Tcst reaches zero.

The dotted line in the figure illustrates how the engine rotational speed Ne would change if delay timers Tcst and Tcl were not used and the rotational speed synchronization control was started immediately when the clutch pedal switch 21 turned "on". In such a case, the engine rotational speed Ne of the engine 2 would not decrease until the throttle valve opening degree TVO increased and the target gear position tGP was changed. Consequently, the drivability would decline when the gear change operation is an upshift operation. However, when the delay timers Tcst and Tcl are used, the rotational speed synchronization control is not started until some time has passed, and thus, the engine rotational speed Ne of the engine 2 can be decreased more rapidly. As a result, the drivability during upshifting can be improved.

The rotational speed synchronization control continues until a time t15 when the clutch pedal switch 21 turns "off". The clutch disconnection delay timer Tcl is reset to its initial value at the time t15 corresponding to when the clutch pedal switch 21 turns "off", and the coast determination delay timer Tcst is reset to its initial value at a time t16 corresponding to when the idle switch 22 turns "off".

FIG. 6 shows what occurs when the transmission 15 is downshifted from third gear to second gear while the vehicle is in a coasting state. Since the vehicle is in a coasting state, the idle switch 22 is already "on" and the value of the coast determination delay timer Tcst (which counts down when the idle switch 22 turns "on") is already at zero.

At a time t21, the clutch pedal switch 21 turns "on" and the clutch disconnection delay timer Tcl starts counting down. At a time t22, the clutch disconnection delay timer Tcl reaches zero and the rotational speed synchronization control is permitted and starts. The clutch disconnection delay timer Tcl is set to reach zero when a second prescribed time that is shorter than the first prescribed time elapses. Consequently, the drop in the engine rotational speed Ne of the engine 2 that occurs between when the clutch pedal switch 21 turns "on" and when the rotational speed synchronization control starts is small.

At a time t23, the shift lever 19 is operated such that the target gear position tGP is changed from the third gear position to the second gear position; the engine rotational speed Ne of the engine 2 increases toward the target engine rotational speed tNe. Since, as explained previously, the drop in the engine rotational speed Ne of the engine 2 is small before the rotational speed synchronization control starts, the engine rotational speed Ne of the engine 2 rises to the target engine rotational speed tNe very quickly.

Then, at a time t24, the clutch pedal switch 21 turns "off" and the rotational speed synchronization control ends. The clutch disconnection delay timer Tcl is reset to the initial value.

The operational effects of the present invention will now be explained.

The engine controller 1 in accordance with the illustrated embodiment is configured and arranged to start the rotational speed synchronization control when the clutch 18 has been released (i.e., when clutch pedal switch 21 is "on") and a prescribed delay time has elapsed since the clutch 18 was released and, after the rotational speed synchronization control is started, to control the engine 2 such that the engine rotational speed Ne of the engine 2 becomes substantially equal to (match) a predicted input rotational speed that the transmission 15 will have after shifting (target engine rotational speed tNe). The predicted input rotational speed of the transmission 15 (target engine rotational speed tNe) is determined based on the post-shift gear position (target gear position tGP) and the vehicle speed VSP.

Since the rotational speed synchronization control is not executed until a prescribed delay time has elapsed since the clutch 18 was released, the engine rotational speed Ne of the engine 2 decreases rapidly after the clutch 18 is released. As a result, the engine control apparatus can prevent the decline in drivability that occurs when the rotational speed synchronization control is contrived such that the rotational speed of the engine 2 does not readily decrease from a rotational speed corresponding to the pre-shift gear position during upshifting.

Additionally, the engine controller 1 is configured and arranged to start execution of the rotational speed synchronization control when it detects that the shift lever 19 (which serves to change the gear position of the transmission 15) has been operated, even if the prescribed delay time has not yet elapsed. As a result, when a downshift operation is performed by the driver, the rotational speed of the engine 2 can be increased to a post-shift rotational speed quickly and the downshift response can be improved. Meanwhile, during upshifting, since the target engine rotational speed tNe decreases due to the change in the gear position, the problem of the drivability declining due to the engine rotational speed Ne of the engine 2 not readily decreasing from a rotational speed corresponding to the pre-shift gear position does not occur.

The prescribed delay time is changed in accordance with whether the vehicle is in a driven state or a coasting state. More specifically, the prescribed delay time is set to a shorter amount of time if the vehicle is in a coasting state before the shift operation is performed than if the vehicle is in a driven state before the shift operation is performed.

When the vehicle is in a coasting state, the possibility that the next shift operation will be a downshift operation is high. Therefore, by making the prescribed delay time shorter when the vehicle is coasting, the drop in the engine rotational speed Ne of the engine 2 that occurs before the rotational speed synchronization control starts can be minimized and the engine rotational speed Ne of the engine 2 can be increased to the post-downshift rotational speed quickly, thus improving the downshift response. Meanwhile, when the vehicle is in a driven state, the possibility that the next shift operation will be an upshift operation is high. Therefore, by making the prescribed delay time longer when the vehicle is in a driven state, the start of the rotational speed synchronization control is delayed and the engine rotational speed Ne of the engine 2 can be decreased quickly, thus improving the upshift response.

The delay time can also be changed in accordance with the drive state of the vehicle (i.e., whether the vehicle is driven or coasting) by starting the rotational speed synchronization control to be executed when a first prescribed amount of time has elapsed since the depression amount of the accelerator pedal 5 become zero and a second prescribed amount of time that is shorter than the first prescribed amount of time has elapsed since the clutch 18 was released.

Additionally, the engine controller 1 is configured and arranged to start the rotational speed synchronization control before the prescribed delay time has elapsed if the gear position GPini of the transmission 15 is the highest gear position at the point in time when the clutch 18 is released. If the gear position GPini is the highest gear position, then the next shift operation must be a downshift operation. In such a case, the rotational speed synchronization control is started immediately such that the engine rotational speed Ne of the engine 2 is increased to the post-shift rotational speed quickly and the downshift response is improved.

In addition to the embodiment described heretofore, another embodiment can be achieved by turning the rotational speed synchronization permission flag "on" when any one of the three conditions (Condition 1 to Condition 3) listed below is satisfied. The other embodiment will now be explained.

Condition 1: the clutch pedal switch 21 is "on" and a prescribed amount of time (second prescribed amount of time in the first embodiment) has elapsed since the clutch pedal switch 21 turned "on".

Condition 2: the clutch pedal switch 21 is "on" and the target gear position has changed (i.e., a shift operation has been performed that changed the gear position of the transmission 15).

Condition 3:the clutch pedal switch 21 is "on" and the gear position was the highest gear position (sixth gear in this embodiment) at the point in time when the clutch pedal switch 21 turned "on".

Figure 7:
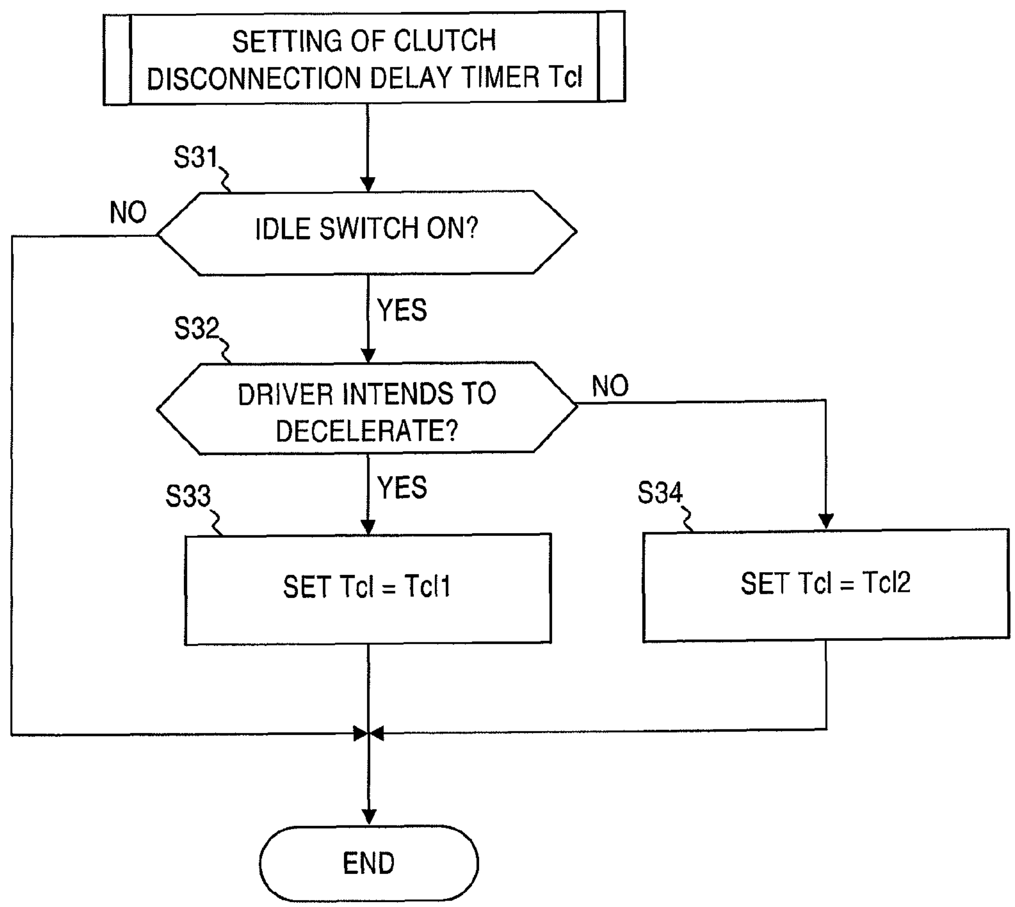
FIG. 7 is a flowchart showing the control processing executed in order to set a clutch disconnection delay timer.

FIG. 7 is a flowchart of the control processing executed in order to set the delay timer Tcl.

The engine controller 1 detects if the driver intended to decelerate or accelerate before the clutch was disconnected based on a brake operation or accelerator operation performed by the driver and sets the time of the clutch disconnection delay timer.

In step S31, the engine controller 1 determines if the clutch pedal switch 21 is "on". If so, the engine controller 1 proceeds to step S32.

In step S32, the engine controller 1 determines if the driver had an intent to decelerate the vehicle before the clutch was disconnected. In this embodiment, the engine controller 1 determines that the driver intended to decelerate the vehicle if the driver performed a brake operation. If it determines that there was an intent to decelerate, then the engine controller 1 proceeds to step S33 and sets the clutch disconnection delay timer Tcl to a value Tcl1 (Tcl=Tcl1). Otherwise, the engine controller 1 proceeds to step S34 and sets the clutch disconnection delay timer Tcl to a value Tcl2 (Tcl=Tcl2). The time Tcl1 is shorter than the time Tcl2. For example, the time Tcl1 is approximately 0.2 second and the time Tcl2 is approximately 0.3 second. Thus, the brake switch 27 and the engine controller 1 cooperate together to constitute one example of a deceleration intent detecting component (e.g., a brake operation detecting component) for the illustrated embodiments.

Figure 8:
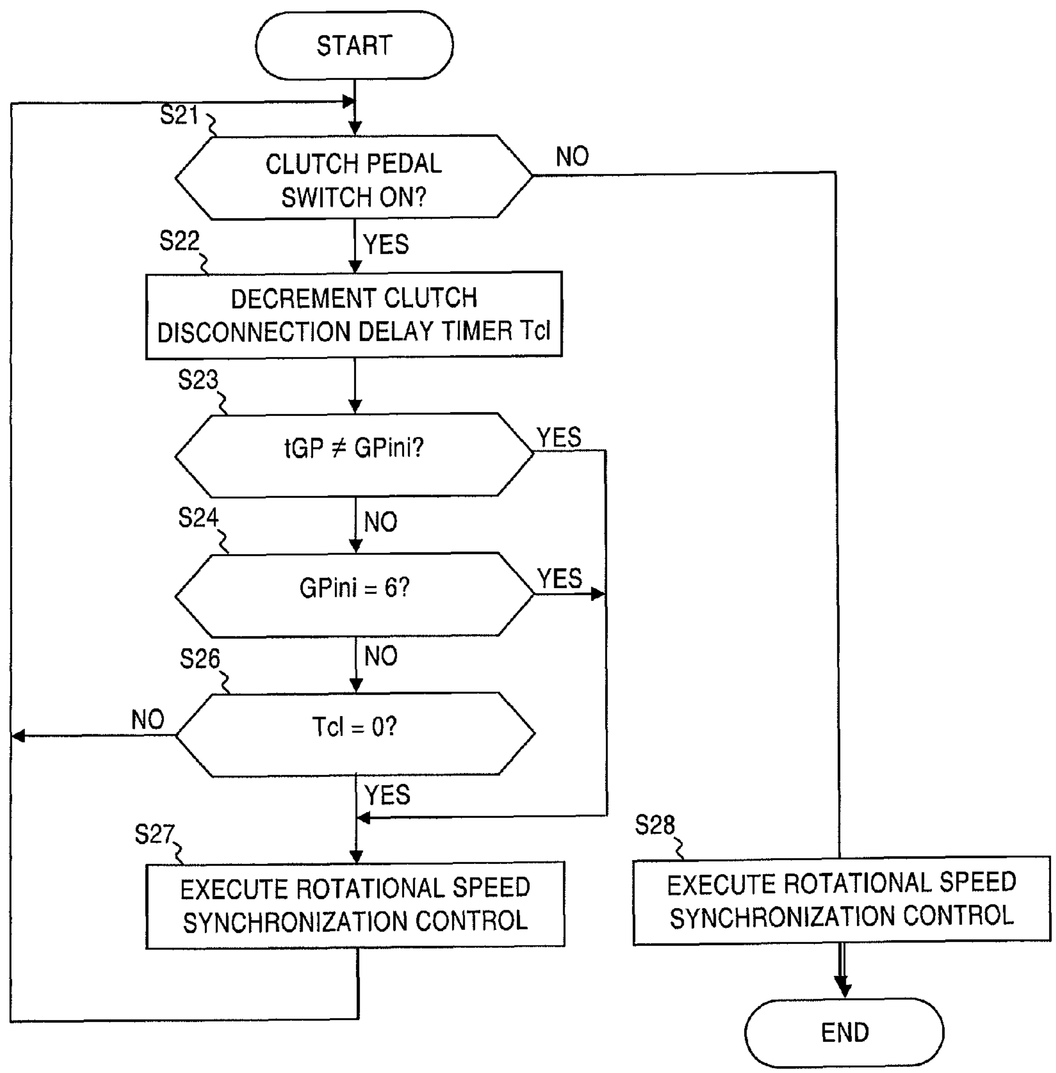
FIG. 8 is a flowchart illustrating the content of a rotational speed synchronization control in accordance with a second embodiment.

The rotational speed synchronization control executed in this embodiment is as shown in FIG. 8. Since only the portion from step S24 to step S26 differs from FIG. 4, that portion alone will now be explained. In step S24, the engine controller 1 determines if the gear position GPini was the highest gear position of the transmission 15 (sixth gear in this embodiment) when the clutch pedal switch 21 turned "on". If the gear position GPini is the highest position, then the engine controller 1 proceeds to step S27 and executes the rotational speed synchronization control immediately. If not, then the engine controller 1 proceeds to step S26. In step S26, the engine controller 1 determines if the clutch disconnection delay timer Tcl (which was set based on a condition existing before the clutch was disconnected) has reached zero. If the value of the timer Tcl is zero, then the engine controller proceeds to step S27 and executes the rotational speed synchronization control.

In this embodiment, if the vehicle is being downshifted from a decelerating state occurring after a brake operation, then the clutch delay timer Tcl (set to time Tcl1, which is smaller than time Tcl2) starts counting down when the clutch pedal switch 21 turns "on". The rotational speed synchronization control is permitted and starts when the clutch disconnection delay timer Tcl reaches zero.

Thus, if the vehicle is decelerating, then the clutch disconnection delay timer Tcl will reach zero in an amount of time Tcl1 that is shorter than the amount of time Tcl2 in which it reaches zero when the vehicle is not decelerating. Since the time Tcl1 is shorter, the drop in the engine rotational speed Ne of the engine 2 is small during the period from when the clutch pedal switch 21 turns "on" until the rotational speed synchronization control starts.

Since the possibility that the next shift operation will be a downshift operation is high when the vehicle is decelerating, the downshift response can be improved by making the prescribed delay time shorter when the vehicle is decelerating because, by doing so, the drop in the engine rotational speed Ne of the engine 2 that occurs before the rotational speed synchronization control starts can be minimized and the engine rotational speed Ne of the engine 2 can be increased to the post-downshift rotational speed quickly.

Meanwhile, if the vehicle is not determined to be decelerating, the clutch disconnection delay timer Tcl is set to a time value Tcl2 that is longer than the time value Tcl1, which is set when the vehicle has been determined to be decelerating.

For example, when the vehicle is in a driven state, the possibility that the next shift operation will be an upshift operation is high. Therefore, by making the prescribed delay time longer when the vehicle is in a driven state, the start of the rotational speed synchronization control is delayed and the engine rotational speed Ne of the engine 2 can be decreased quickly, thus improving the upshift response.

In step S31 of FIG. 7, it is also acceptable to determine if the driver had an intent to accelerate the vehicle instead of determining if the driver had an intent to decelerate the vehicle. In such a case, the engine controller 1 can be configured and arranged to determine if the driver has an intent to accelerate the vehicle based on a disconnection of the clutch and an operation of the accelerator. If it determines that the driver had an intent to accelerate before the clutch was disconnected, then the engine controller 1 proceeds to step S33. If it determines that the driver did not intend to accelerate, then the engine controller 1 proceeds to step S32.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An engine control apparatus for a vehicle equipped with a manual transmission, the engine control apparatus comprising:

a clutch release detecting component configured to detect when a clutch arranged between an engine and the manual transmission has been released to prevent rotation from being transferred from the engine to the manual transmission when the manual transmission is being shifted;

a time measuring component configured to measure an amount of time that elapses after the clutch is released; and a rotational speed synchronization control component configured to start rotational speed synchronization control upon the clutch being released and a prescribed delay time having elapsed since the clutch was released, the rotational speed synchronization control component being configured to perform the rotational speed synchronization control such that before shifting is completed, an engine rotational speed of the engine matches a predicted input rotational speed of the manual transmission being determined based on a vehicle speed and a gear position that is occurring before shifting is completed, and after shifting is completed, the engine rotational speed of the engine matches the predicted input rotational speed of the manual transmission being determined based on the vehicle speed and the gear position that is occurring after shifting is completed.

2. An engine control apparatus for a vehicle equipped with a manual transmission, the engine control apparatus comprising:

a shift operation detecting component configured to detect a manual shift operation;

a clutch release detecting component configured to detect when a clutch arranged between an engine and the manual transmission has been released to prevent rotation from being transferred from the engine to the manual transmission when the manual transmission is being shifted;

a time measuring component configured to measure an amount of time that elapses after the clutch is released; and a rotational speed synchronization control component control configured to start rotational speed synchronization control upon the clutch being released and a prescribed delay time having elapsed since the clutch was released, the rotational speed synchronization control component being configured to perform the rotational speed synchronization control such that an engine rotational speed of the engine matches a predicted input rotational speed of the manual transmission being determined based on a vehicle speed and a gear position that is occurring after shifting is completed, the rotational speed synchronization control component being configured to selectively start the rotational speed synchronization control upon the clutch being released and the manual shift operation having been detected by the shift operation detecting component, and start the rotational speed synchronization control after the prescribed delay time has elapsed since the clutch was released and the manual shift operation having not been detected by the shift operation detecting component.

3. The engine control apparatus as recited in claim 1, wherein the rotational speed synchronization control component is further configured to selectively change the prescribed delay time depending on whether the vehicle is in a driven state or a coasting state before the manual transmission is shifted.

4. The engine control apparatus as recited in claim 3, wherein the rotational speed synchronization control component is further configured to selectively set the prescribed delay time to be shorter if the vehicle is in the coasting state before the manual transmission is shifted than if the vehicle is in the driven state before the manual transmission is shifted.

5. The engine control apparatus as recited in claim 1, further comprising a deceleration intent detecting component configured to detect a driver deceleration intent, the rotational speed synchronization control component being further configured to selectively change the prescribed delay time based on the driver deceleration intent detected by the deceleration intent detecting component before the clutch is released.

6. The engine control apparatus as recited in claim 5, wherein the deceleration intent detecting component includes a brake operation detecting component that is configured to detect a brake operation, the rotational speed synchronization control component being further configured to selectively set the prescribed delay time to be shorter if the brake operation has been detected than if the brake operation has not been detected.

7. The engine control apparatus as recited in claim 1, further comprising an acceleration intent detecting component configured to detect a driver acceleration intent, the rotational speed synchronization control component being further configured to selectively change the prescribed delay time based on the driver acceleration intent detected before the clutch is released.

8. The engine control apparatus as recited in claim 1, further comprising a brake operation detecting component configured to detect a driver braking operation; and an accelerator operation detecting component configured to detect a driver accelerator operation, the rotational speed synchronization control component being further configured to selectively change the prescribed delay time to be shorter if the brake operation occurs before the clutch is released than if the accelerator operation occurs before the clutch is released.

9. An engine control apparatus for a vehicle equipped with a manual transmission, the engine control apparatus comprising:

an accelerator off detecting component configured to detect if an accelerator operation amount is zero;

a clutch release detecting component configured to detect when a clutch arranged between an engine and the manual transmission has been released to prevent rotation from being transferred from the engine to the manual transmission when the manual transmission is being shifted;

a time measuring component configured to measure an amount of time that elapses after the clutch is released the time measuring component including a first determining component configured to determine if a first prescribed amount of time has elapsed since the accelerator operation amount became zero, a second determining component configured to determine if a second prescribed amount of time has elapsed since the clutch was released, with the second prescribed amount of time being shorter than the first prescribed amount of time;

a rotational speed synchronization control component configured to start rotational speed synchronization control upon the clutch being released and a prescribed delay time having elapsed since the clutch was released, the rotational speed synchronization control component being configured to perform the rotational speed synchronization control such that an engine rotational speed of the engine matches a predicted input rotational speed of the manual transmission being determined based on a vehicle speed and a gear position that is occurring after shifting is completed, the rotational speed synchronization control component being configured to start execution of the rotational speed synchronization control upon the first prescribed amount of time having elapsed since the accelerator operation amount become zero and the second prescribed amount of time having elapsed since the clutch was released, and to change the prescribed delay time depending on whether the vehicle is in a coasting state or a driven state before the manual transmission is shifted.

10. The engine control apparatus as recited in claim 1, further comprising a gear position detecting component configured to detect a gear position of the manual transmission, the rotational speed synchronization control component being configured to start the rotational speed synchronization control before the prescribed delay time has elapsed if the gear position of the manual transmission is a highest gear position of the manual transmission at a point in time when the clutch is released.

11. A rotational speed synchronization control method comprising:

detecting when a clutch arranged between an engine and a manual transmission has been released to prevent rotation from being transferred from the engine to the manual transmission when the manual transmission is being shifted;

measuring an amount of time that elapses after the clutch is released; and conducting rotational speed synchronization control to start upon the clutch being released and a prescribed delay time having elapsed since the clutch was released so that before shifting is completed, an engine rotational speed of the engine matches a predicted input rotational speed of the manual transmission being based on a vehicle speed and a gear position that is occurring before shifting is completed, and after shifting is completed, the engine rotational speed of the engine matches the predicted input rotational speed of the manual transmission being determined based on the vehicle speed and the gear position that is occurring after shifting is completed.

12. The rotational speed synchronization control method as recited in claim 11, wherein the conducting of the rotational speed synchronization control is performed by selectively starting the rotational speed synchronization control when the clutch is released and a manual shift operation has been detected, and starting the rotational speed synchronization control after the prescribed delay time has elapsed since the clutch was released and the manual shift operation is not detected.

13. The rotational speed synchronization control method as recited in claim 11, wherein the conducting of the rotational speed synchronization control is further performed by selectively changing the prescribed delay time depending on whether the vehicle is in a driven state or a coasting state before the manual transmission is shifted.

14. The rotational speed synchronization control method as recited in claim 13, wherein the conducting of the rotational speed synchronization control is further performed by selectively setting the prescribed delay time to be shorter if the vehicle is in the coasting state before the manual transmission is shifted than if the vehicle is in the driven state before the manual transmission is shifted.

15. The rotational speed synchronization control method as recited in claim 11, wherein the conducting of the rotational speed synchronization control is further performed by selectively changing the prescribed delay time based on a driver deceleration intent before the clutch is released.

16. The rotational speed synchronization control method as recited in claim 15, wherein the conducting of the rotational speed synchronization control is further performed by selectively setting the prescribed delay time to be shorter if a brake operation has been detected than if the brake operation has not been detected.

17. The rotational speed synchronization control method as recited in claim 11, wherein the conducting of the rotational speed synchronization control is further performed by selectively changing the prescribed delay time based on a driver acceleration intent detected before the clutch is released.

18. The rotational speed synchronization control method as recited in claim 11, wherein the conducting of the rotational speed synchronization control is further performed by selectively changing the prescribed delay time to be shorter if a brake operation occurs before the clutch is released than if an accelerator operation occurs before the clutch is released.

19. The rotational speed synchronization control method as recited in claim 11, wherein the conducting of the rotational speed synchronization control is further performed by starting execution of the rotational speed synchronization control when a first prescribed amount of time has elapsed since an accelerator operation amount become zero and a second prescribed amount of time has elapsed since the clutch was released with the second prescribed amount of time being shorter than the first prescribed amount of time, and changing the prescribed delay time depending on whether the vehicle is in a coasting state or a driven state before the manual transmission is shifted.

20. The rotational speed synchronization control method as recited in claim 11, wherein the conducting of the rotational speed synchronization control is further performed by starting the rotational speed synchronization control before the prescribed delay time has elapsed if a gear position of the manual transmission is a highest gear position of the manual transmission at a point in time when the clutch is released.

* * * * *